United States Patent
Hogue et al.

[11] Patent Number: 5,248,013
[45] Date of Patent: Sep. 28, 1993

[54] HEATSHIELD INSTALLATION FOR AIRCRAFT BRAKE

[75] Inventors: William O. Hogue, Brookville; Lowell D. Bok, Anna, both of Ohio

[73] Assignee: The B. F. Goodrich Company, Akron, Ohio

[21] Appl. No.: 835,177

[22] Filed: Feb. 13, 1992

[51] Int. Cl.5 .................................. F16D 65/84
[52] U.S. Cl. .................... 188/264 G; 301/6.2
[58] Field of Search .......... 188/18 A, 71.5, 264 G, 188/71.1; 301/6 A, 6 CS, 6 WB, 6.2, 6.3, 6.91

[56] References Cited

U.S. PATENT DOCUMENTS

| | | | |
|---|---|---|---|
| 2,981,376 | 4/1961 | Zeidler | 188/71.5 |
| 3,061,050 | 10/1962 | Horn | 188/264 G |
| 3,887,041 | 6/1975 | Malone | 188/71.5 |
| 3,958,833 | 5/1976 | Stanton | 301/6 A |
| 4,017,123 | 4/1977 | Horner et al. | 301/6 WB |
| 4,326,610 | 4/1982 | Mouza | 188/264 AA X |
| 4,585,096 | 4/1986 | Bok | 188/71.5 X |
| 4,703,837 | 11/1987 | Guichard | 188/71.5 |
| 4,782,922 | 11/1988 | Pearson et al. | 188/71.1 |
| 4,795,004 | 1/1989 | Bauer | 188/106 F X |
| 4,856,619 | 8/1989 | Petersen | 188/264 G |
| 4,878,563 | 11/1989 | Baden et al. | 188/71.5 |
| 4,950,035 | 8/1990 | Villarreal et al. | 188/264 AA X |
| 5,002,342 | 3/1991 | Dyko | 188/264 G X |
| 5,024,297 | 6/1991 | Russell | 188/18 A |
| 5,107,968 | 4/1992 | Delpassand | 188/264 G |

FOREIGN PATENT DOCUMENTS 2161560 1/1986 United Kingdom ............. 188/71.5

Primary Examiner—Robert J. Oberleitner
Assistant Examiner—Peter M. Poon
Attorney, Agent, or Firm—David M. Ronyak

[57] ABSTRACT

A heat shield installation for a tire-supporting wheel and brake assembly having a rim member with an inner surface that surrounds a heat sink composed of stator and rotor brake discs which may extend axially beyond the rim member. A plurality of circumferentially spaced torque bars are located between the heat sink and the inner surface of the rim member with such torque bars slidably engaging notches in the outer periphery of the rotor discs. An interior heat shield is located between the inner surface and the torque bars with fasteners interconnecting such heat shield and torque bars to the rim member. An exterior heat shield of cylindrical configuration having a plurality of circumferentially spaced series of louvers is secured to the rim member to protect the interior heat shield and brake discs.

20 Claims, 6 Drawing Sheets

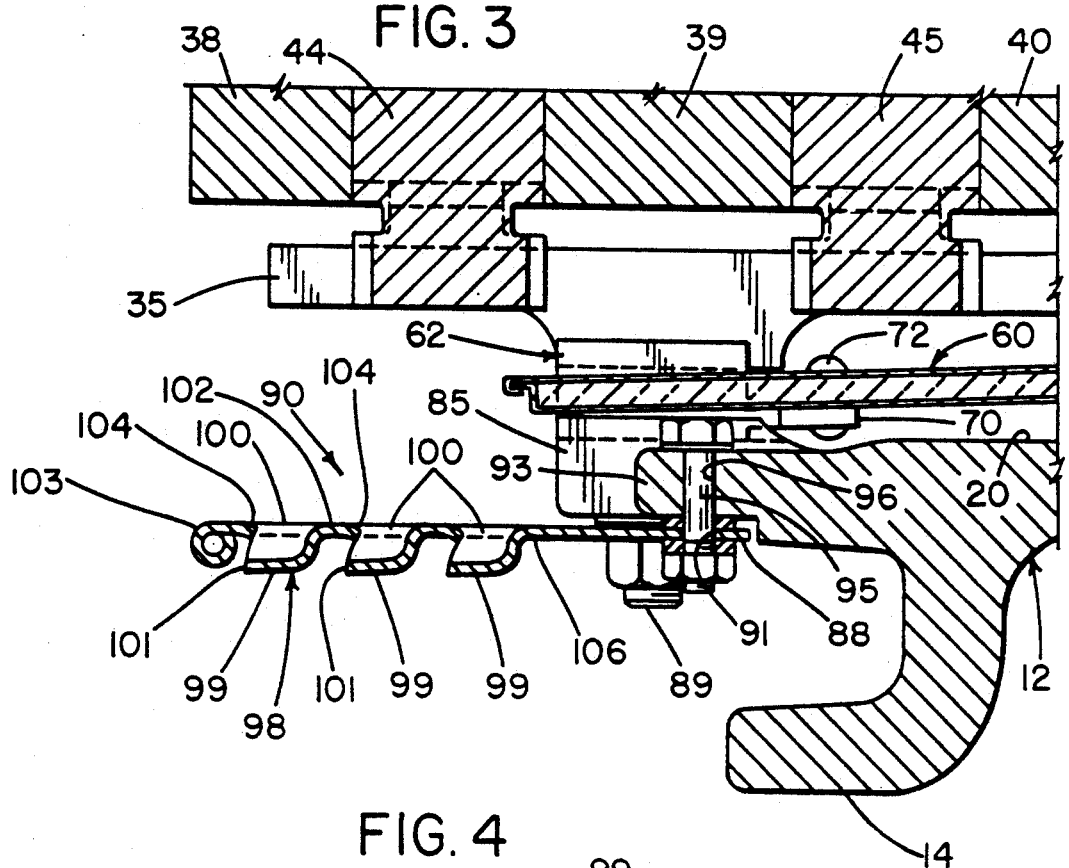
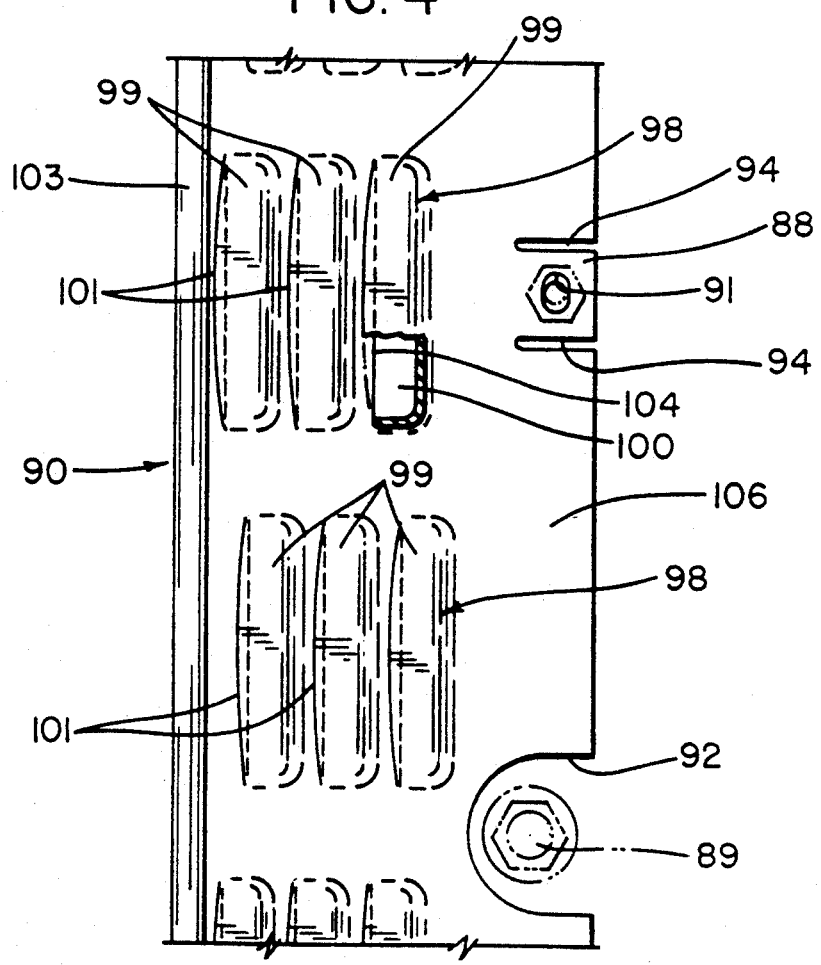

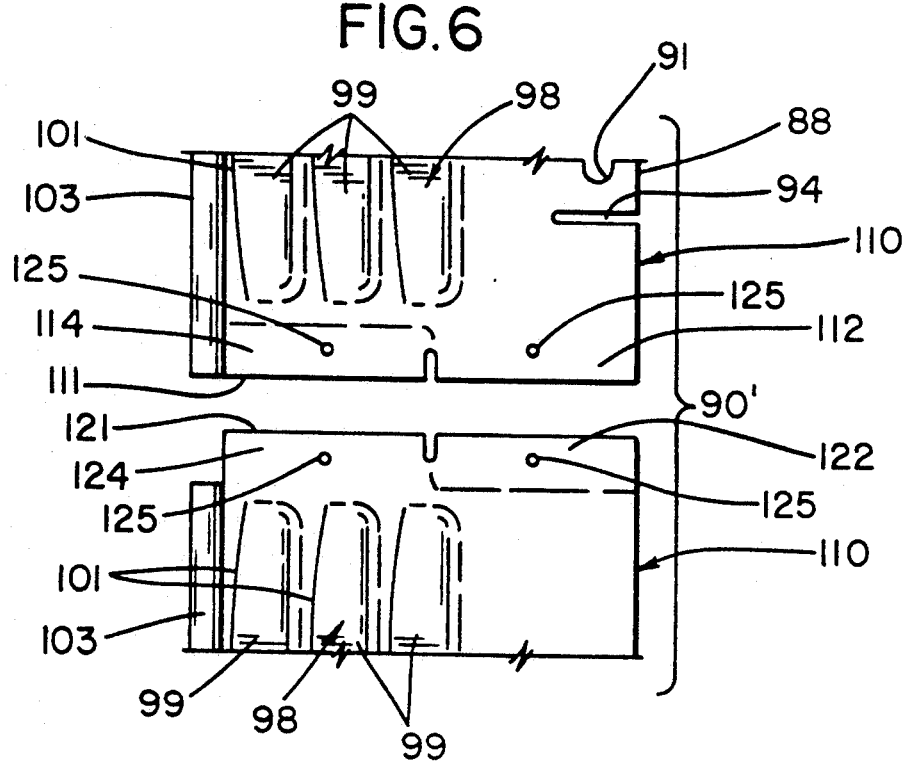
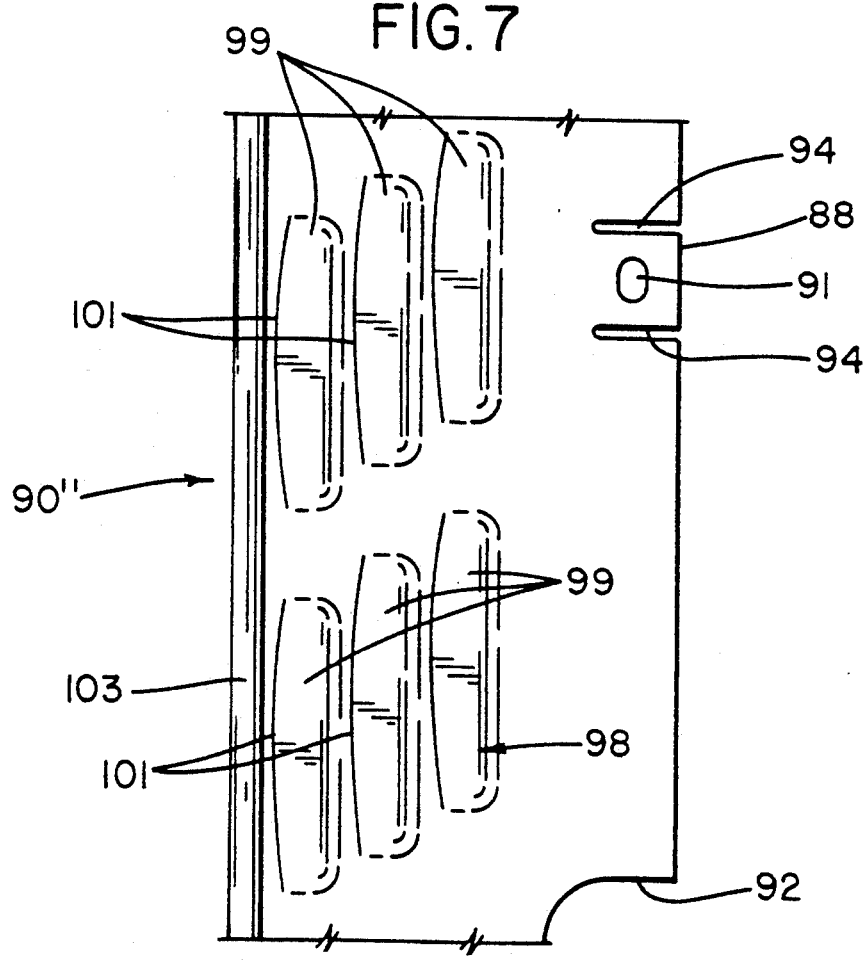

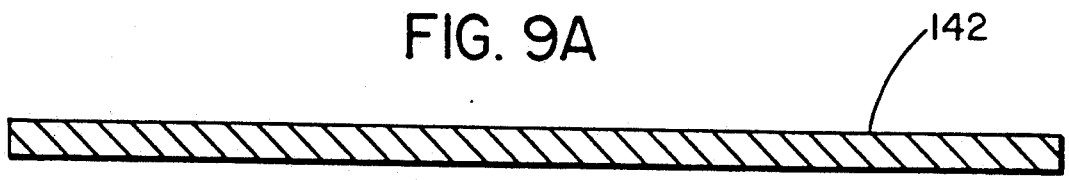
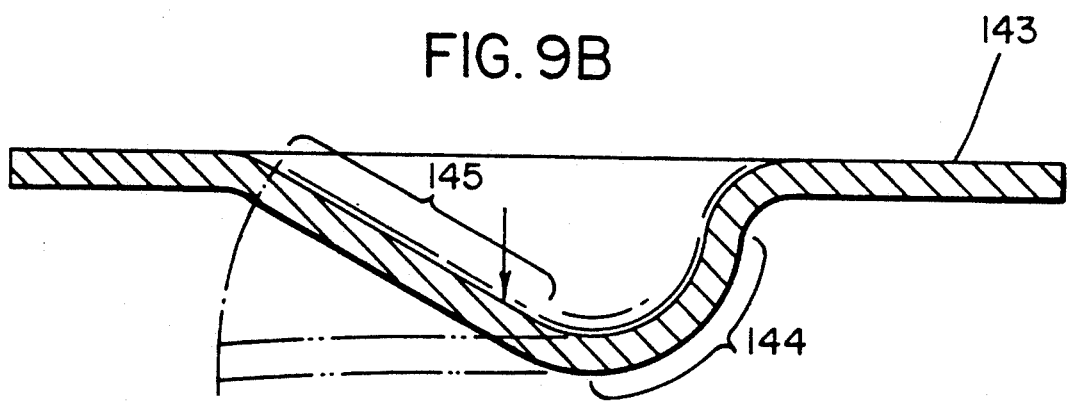
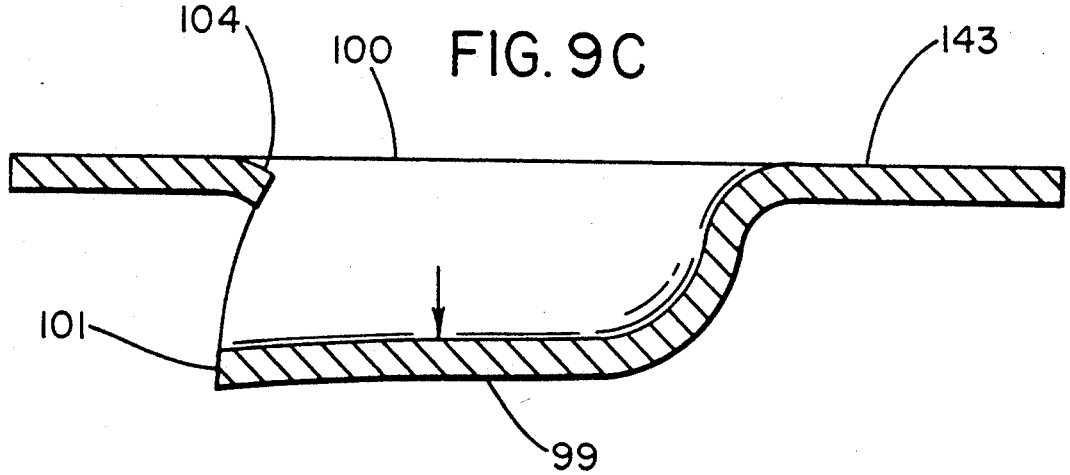

HEATSHIELD INSTALLATION FOR AIRCRAFT BRAKE

BACKGROUND OF THE INVENTION

This invention relates to a multi-disc aircraft brake system and more particularly to a new and improved protective heat shield installation for an aircraft multi-disc friction braking system.

During the braking of an aircraft, the alternately splined stator and rotor discs of each of the multi-disc brakes are brought into sliding contact with another, generating considerable heat energy that must be dissipated to eliminate the highly deteriorative effects on the wheel and tire structure which, in certain instances such as an aborted or rejected take-off, can result in sufficiently high temperature to result in tire ruptures or fires.

The heat energy generated within the braking elements of the stators and rotors (hereinafter also referred to as the heat sink), of each multi-disc brake is dissipated via conduction, radiation and convection to the adjacent braking components, such as the wheel assembly, bearings, pistons and other adjacent structures as well as the associated tire. It is important to limit the heat transfer into the adjacent structures and tire as much as possible to protect these structures from excessive temperatures while dissipating the heat energy from the heat sink to the atmosphere as quickly as possible. In certain braking systems, the heat sink is of greater axial dimension than the wheel rim member into which the heat sink extends. In such a braking system, it is important to protect the tire from excessive radiant heat and the heat sink from contaminants such as water, especially water containing de-icing chemicals, and other debris that may be kicked up from the runway. One manner of protecting these is to provide a heat shield between the heat generating elements of the (stators and rotors) heat sink and the wheel assembly, with its adjacent components and bearings.

SUMMARY OF THE INVENTION

The present invention is directed to a tire supporting wheel and brake assembly including a protective heat shield. The wheel has a rim member having an inner surface that surrounds a heat sink composed of a plurality of stator and rotor brake discs. The stators are slidably connected to a torque tube that is connected to the stationary portion of the wheel supporting structures while the rotors are slidably mounted to circumferentially spaced torque bars that are connected to the rotatable wheel. A generally cylindrical louvered protective heat shield extends axially beyond and is secured to the rim member to overlie a portion of the interior wheel heat shield to protect such interior wheel heat shield and protect the tire, wheel and brake discs while enhancing convection cooling of the brake discs. A separate interior wheel heat shield is located in the clearance space between the inner surface of the rim member and the circumferentially spaced torque bars and secured thereto.

The protective heat shield of the present invention is a generally cylindrical structure having a series of spaced louvers along and about its circumference that is fastened to the wheel. The heat shield may be a single piece cylindrical structure or formed of arcuate segments which when assembled form a cylindrical structure. The heat shield serves to protect the tire and wheel rim flange from excessive brake heat during high energy stop conditions by blocking the radiation path while enhancing convection cooling of the heat sink due to the presence of the louvers. In addition to the above described advantage, the louvered heat shield protect the braking elements by impeding the ingress of rain or other liquids and foreign objects as the vehicle is moving because the ingression path is blocked and any matter which may contact the shield is deflected away due to its rotation with the wheel. The louvers are constructed to retain any liquid on the circumferentially external surface of the shield by provision of a raised lip at the bottom of each louver opening. Also liquid sprayed on the circumferentially external surface of the shield such as that created by the action of the tires rolling on the runway will not easily enter the louvered opening because of its overlapping construction. The heat shield also serves to protect the interior wheel heat shield, which may be vulnerable to damage during maintenance operations, from handling damage and is easily replaceable.

BRIEF DESCRIPTION OF THE DRAWINGS

FIG. 3 is a front elevational view partly in section of a portion of a protective heat shield according to the invention mounted on the inboard end of the rim member;

FIG. 4 is a fragmentary plan view of the protective heat shield shown in FIG. 3;

FIG. 6 is a fragmentary exploded view of the joint of FIG. 5;

FIG. 7 is a fragmentary elevational view of another embodiment of a protective heat shield according to the invention having an alternate arrangement of louvers useful in the invention;

FIGS. 9A through 9C are schematic sectional views showing the manner of formation of a louver according to the invention.

DETAILED DESCRIPTION

Figure 1:
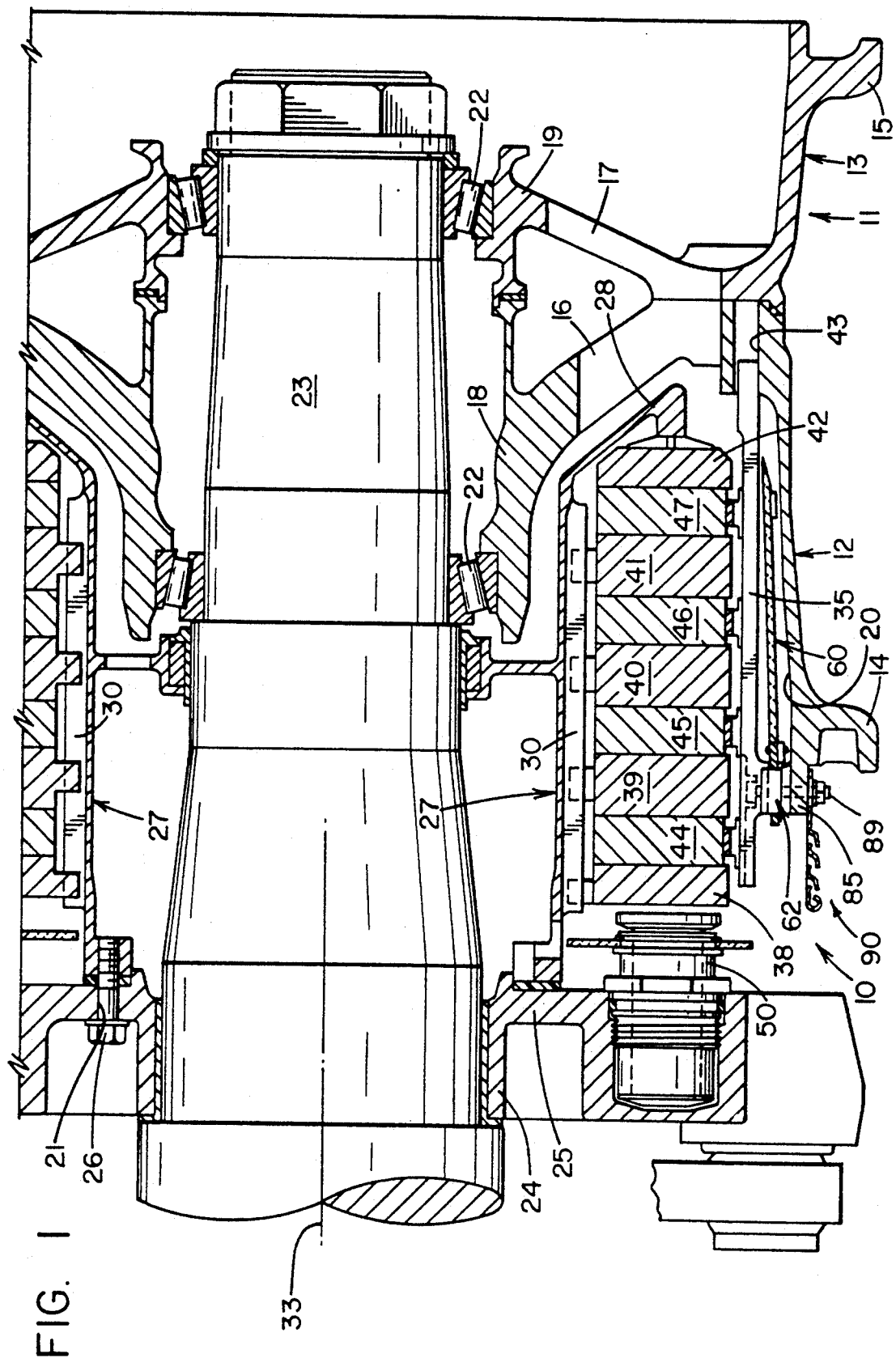
FIG. 1 is a fragmentary cross-sectional view of a wheel and brake assembly with heat shields according to the invention installed thereon.

Referring to the drawings, wherein like reference numerals designate like or corresponding parts throughout the several views, there is shown in FIG. 1 a friction brake mechanism 10 for use with a cylindrical wheel 11, having matching inboard wheel section 12 and outboard wheel section 13. Each of the wheel sections 12, 13 has a corresponding respective rim member 14, 15, web member 16, 17, and hub member 18, 19. The wheel sections 12 and 13 are fastened together by suitable bolts (not illustrated) disposed in aligned bores (not illustrated) within web members 16 and 17 to form an integral unit. Friction brake mechanism 10 is generally symmetrical about its central axis of rotation 33.

The hub members 18 and 19 are rotatably supported by bearings 22 mounted on a nonrotatable axle member 23. A stationary carrier or boss 24 provided with a circumferentially-extending flange 25 is suitably mounted on stationary axle 23. Flange 25 has a plurality of circumferentially spaced bores 21 to receive bolts 26 for securing such flange to one end of a cylindrical torque tube 27. The other (outboard) end of torque tube 27 has an annular and radially outwardly extending reaction member 28. The reaction member 28 may be made integrally with the torque tube 27 as illustrated in FIG. 1 or may be made as a separate annular piece and suitably connected to the torque tube 27.

Torque tube 27 has on its exterior a plurality of circumferentially spaced, axially extending splines 30. Inboard wheel section 12 has a plurality of circumferentially spaced torque-transmitting bars 35 each connected to the rim flange portion 85 of wheel section 12 at their inboard ends by respective spacer means 62 to be described and at their outboard ends to the radially outward portion of web member 16 by seating in respective annular recesses 43 in such web member. The torque bars 35 may be varied in design from those shown and secured to the wheel section 12 by other suitable means such as is described in U.S. Pat. No. 5,024,297 to Russell to provide an integral connection therebetween.

Splines 30 support an axially non-rotatable piston end disc or stator disc 38 and inner discs 39, 40 and 41. All of such non-rotatable discs 38, 39, 40 and 41 have slotted openings at circumferentially spaced locations on their respective inner peripheries for captive engagement by the splines 30, as is old and well-known in the art. A non-rotatable annular disc or annular braking element 42 is suitably connected to the torque plate or reaction member 28 and acts in concert with the stator discs 38, 39, 40 and 41 which discs (38, 39, 40, 41 and 42) constitute the stators for the friction brake 10. A suitable manner of connection of disc 42 to reaction member 28 is described in U.S. Pat. No. 4,878,563 to Baden et al.

Each of a plurality of axially-spaced discs (rotor discs) 44, 45, 46 and 47 interleaved between the stator discs 38 through 42, has a plurality of circumferentially spaced openings along its respective outer periphery for engagement by the corresponding wheel torque bar 35, as is old and well known in the art, thereby forming the rotor discs for the friction brake 10. All of the non-rotatable discs (38, 39, 40, 41 and 42) and rotatable discs (44, 45, 46 and 47) may be made from a suitable brake material such as steel or other metal or other wear-resistant material such as carbon for withstanding high temperatures and providing a heat sink. The number and size of discs may be varied as necessary for the application involved. Those stator discs and rotor discs that have circumferentially spaced openings on their repective inner and outer peripheries may accommodate reinforcing inserts to provide reinforcement to the walls of such slotted openings and to enhance the life of such slots, as is old and wellknown in the art.

The actuating mechanism or power means for the brake includes a plurality of circumferentially spaced cylinders 50 suitably mounted on or connected to the flange 25. Within each of the cylinders 50 is a hydraulic piston, which is operative to move the stator discs 38 through 41 axially into and out of engagement with their respective associated rotatable discs 44 through 47, which in turn causes the facing radial surfaces of all of the brake discs to frictionally engage their radial surfaces as they are forced toward but are resisted by the end stationary annular disc 42 and the reaction member 28 on torque tube 27. During this period of brake disc engagement, the friction forces among all the rotatable and non-rotatable discs generate considerable heat energy within the discs. It is the frictional engagement of these stator and rotor discs which produces the braking action for the aircraft wheel.

Figure 2:
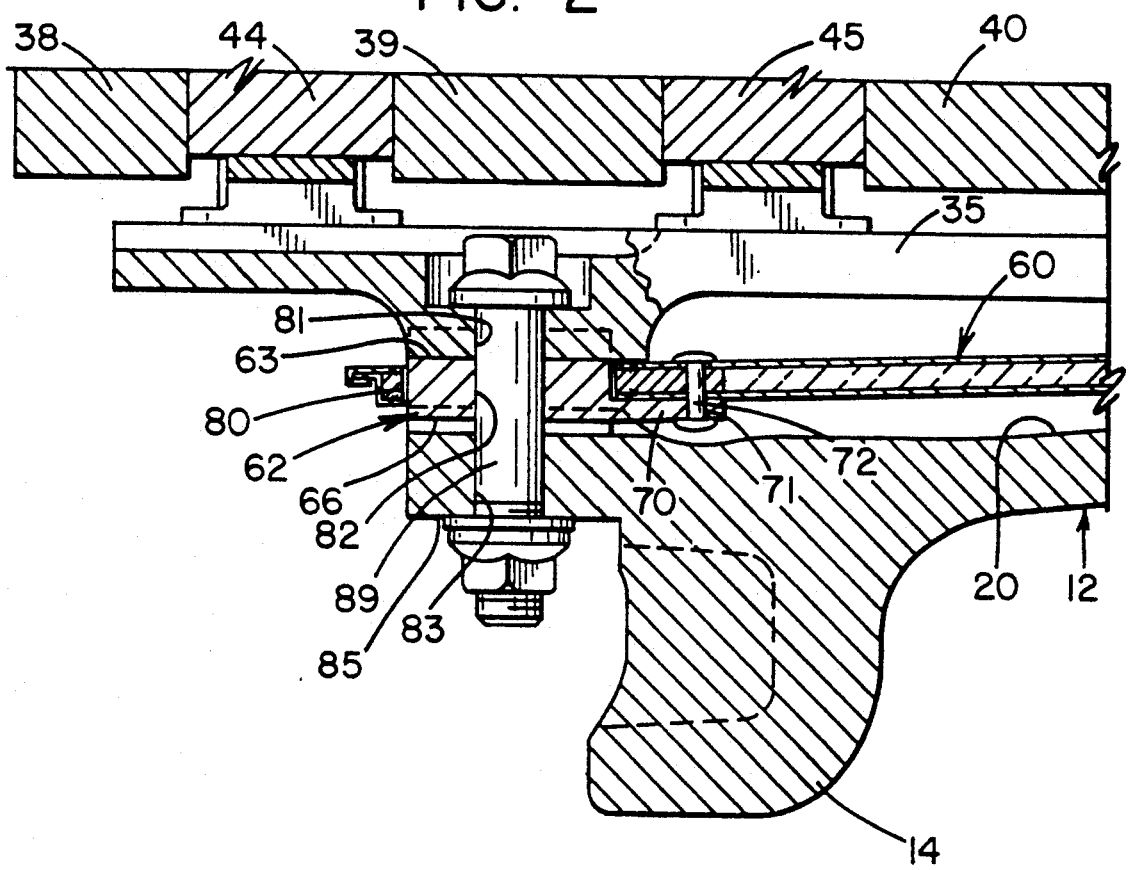
FIG. 2 is a front elevational view partly in section of a portion of an interior wheel heat shield fastened to a torque bar spacer and rim member.

An interior wheel heat shield 60 as shown in FIGS. 1 and 2 is cylindrically shaped and is located between the inner surface 20 of wheel section 12 and the torque-transmitting bars 35. Interior wheel heat shield 60 may be formed as a single cylindrical piece or by joining together a plurality of arcuate pieces. As described above, each torque bar 35 at its outboard (wheel web) end is connected to the web member 16 by seating in an annular recess 43. The inboard (piston) end of each torque bar 35 and the adjacent portion of the heat shield 60 is secured to inboard rim member 14 of inboard wheel section 12 by a spacer 62 (FIG. 2). Spacer 62 is a rectangular shaped member that is recessed on its upper and lower surfaces to present an upper flat surface 63 with a pair of spaced abutments or shoulders that receive the sides of torque bar 35 and present a lower surface 66 with a lower pair of abutments or shoulders. Extending outboardly toward the wheel web member 16 (as viewed in FIG. 2) from the rectangular shaped member of spacer 62 is a flanged portion 70 of substantially less thickness than the main body portion of spacer 62. The flanged portion 70 has a bore 71 to facilitate the securing of the spacer 62 to the interior wheel heat shield 60 by fasteners or a rivet 72.

The interior wheel heat shield 60 has a plurality of circumferentially spaced rectangular apertures 80 adjacent its inboard end to receive the main rectangular shaped body portion of spacer 62 to secure the heat shield axially and radially in position. As seen in FIG. 2, the torque bar 35 has a bore 81 in alignment with a bore 82 (in the spacer 62) and bore 83 in a flanged portion 85 of inboard rim member 14 to receive a bolt 89 which interconnects and secures these members (torque bar 35, spacer 62, heat shield 60 and rim member 14). With the interior wheel heat shield 60 firmly in place, the protective heat shield 90 effectively protects the wheel and its supporting structure from the transfer of heat energy from the heat sink.

The interior wheel heat shield may be formed by laminating a layer of ceramic fibrous material between two layers of stainless steel in a manner well known in the art.

A protective heat shield 90 of cylindrical configuration has a plurality of circumferentially spaced apertures 91 adjacent one side (outboard) edge and a plurality of circumferentially spaced recesses or cut-out portions 92 along the same (outboard) side edge alternating with the apertures 91. Preferably, each of apertures 91 is located within one of a plurality of tabs 88 that are circumferentially spaced from one another along the outboard edge of heat shield 90. Tabs 88 are provided to reduce the stresses in the shield 90, wheel flange portions 93 and the fasteners 95 that might otherwise occur due to thermal gradient induced differences in thermal expansion, or deviation in shape or dimensions of the shield 90 or flange portions 93. The heat shield 90 is mounted on a plurality of flange portions 93 that extend axially inboardly from rim member 14, at circumferentially spaced apart locations with a plurality of fasteners 95 extending through a plurality of corresponding bores 96 in flange portions 93 and apertures 91 in heat shield 90. Flange portions 93 lie substantially along the same arc as flange 85 of rim member 14. The respective circumferentially spaced cut-outs or recesses 92 in heat shield 90 register with the fasteners 89 of the spacers 62. As seen in FIG. 3, the protective heat shield 90 is of a larger diameter than interior wheel heat shield 60 to protect the interior heat shield 60 from the ingress of foreign objects thereinto and for the deflection of foreign materials such as water, deicing chemicals, and other debris which contact the radially exterior surface of protective heat shield 90.

The other (inboard) side edge of the cylindrically shaped heat shield 90 (FIGS. 1, 3, 4 and 4) and 90' (FIG. 5) has a reinforcing edge such as edge 103. Adjacent the inboard side edge the protective heat shield 90 has a plurality of circumferentially spaced series of louvers 98. The louvers in all the series are alike and only one louver will be described. Each louver has a curvilinear radially outer portion or cap 99 that overlies a circumferentially extending aperture 100 with the overlying edge portion 101 of cap 99 being effective to deflect liquid or foreign objects from entering the aperture 100. When viewed in cross section defined by a plane that includes the central axis of rotation 33 as shown in FIGS. 1 and 3, the generally cylindrical radially outer surface of heat shield 90 appears as generally flat surface 106 and edge 101 overlies the aperture 100 such that a plane perpendicular to the generally flat surface 106 of the heat shield 90 and extending radially outward from the edge 104 of aperture 100 would fall inwardly of the edge 101 onto the curvilinear portion 99. The base 102 of each respective louver 98 that joins the main body of the cylindrical heat shield 90 includes an edge 104 having a curvature to allow flow of liquid circumferentially therealong thereby inhibiting the flow of liquid into the aperture 100 from radially external surface 106.

Figure 5:
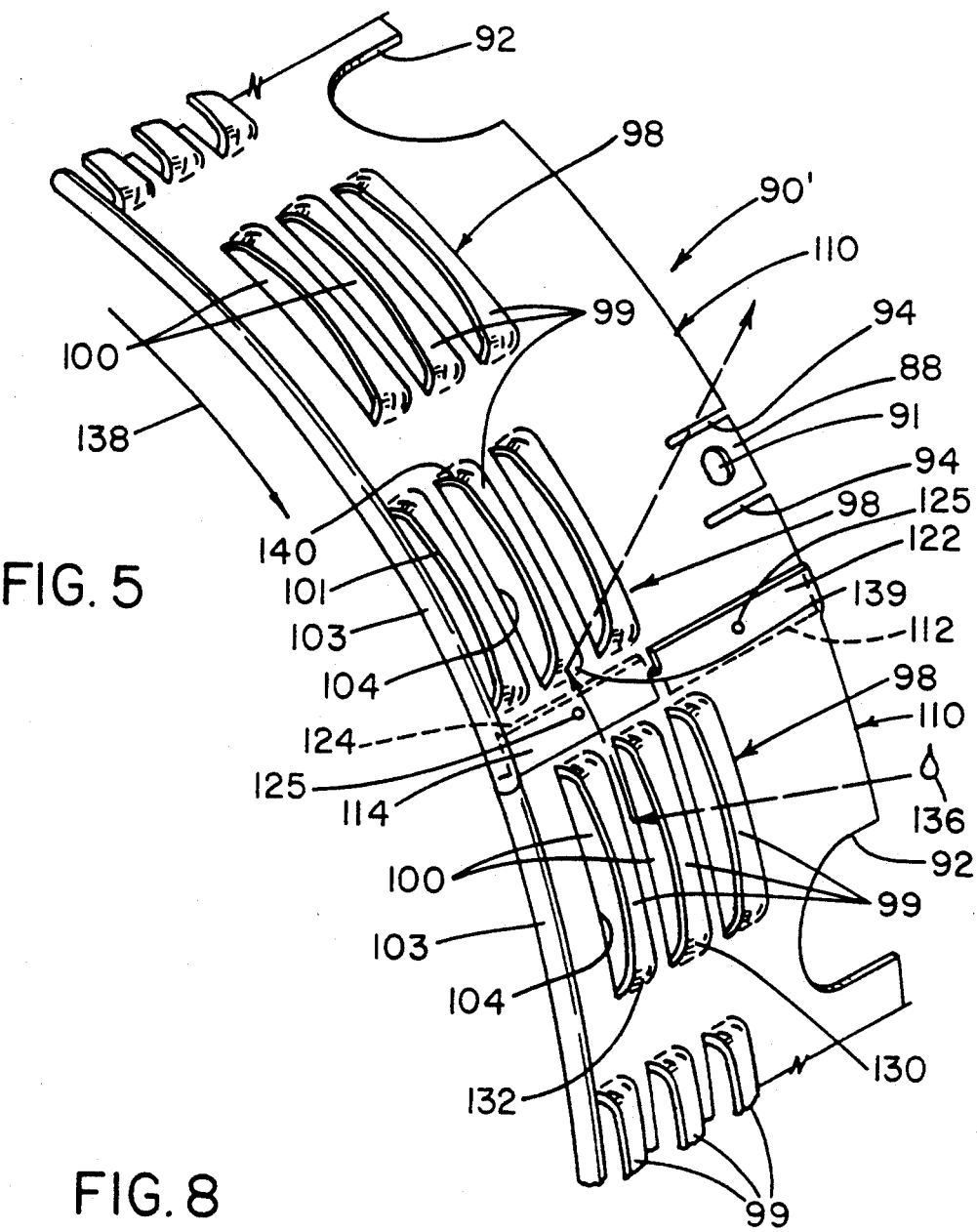
FIG. 5 is a fragmentary perspective view of a segmented cylindrical protective heat shield according to the invention.

In FIGS. 5 and 6 there is illustrated a portion of a modified protective heat shield 90'. Heat shield 90' differs from the previously described embodiment shown in FIGS. 1, 3 and 4 in that it is formed of a plurality of arcuate segments 110 and its circumferentially adjacent sets of louvers 99 are axially offset relative to one another. Each of the arcuate segments 110 is preferably alike as shown. The circumferentially leading edge 111 of segment 110 and the circumferentially trailing edge 121 of adjoining segment 110 are complementarily formed such that they mechanically interlock. The circumferentially leading 111 edge of segment 110 is split approximately midway of its axial width to form axially outboard tab 112 and axially inboard tab 114. The circumferentially trailing edge 121 of adjoining segment 110 is also split approximately midway of its axial width to form axially outboard tab 122 and axially inboard tab 124. When assembled as shown in FIGS. 5 and 6, tab 112 extends beneath tab 122 and tab 114 extends over tab 124. A portion of the reinforced axially inboard edge 103 is removed from each segment 110 to enable full engagement of tabs 112, 122, 114, and 124. Each segment 110 includes an aperture 91 along its outboard side edge and circumferentially spaced therefrom a recess or cutout portion 92. Aperture 91 is positioned within tab 88 which is defined by two circumferentially spaced slots 94 which extend axially from the axially outboard edge of segment 110. The leading edge 111 and the trailing edge 121 of each segment 110 may be provided with apertures 125 for receipt of mechanical fasteners after joinder of two segments 110.

Still having reference to FIG. 5, if shield 90' is impacted between louvers 130 and 132 by liquid such as by drop 136 as shield 90' is rotated in the direction of arrow 138, drop 136 will travel along the external surface of shield 90' until it is deflected radially outwardly by the leading edge ramp or curved surface 139 of cap 99 of louver 140. The leading edge ramp or curved surface of each cap serves to sling off liquids which contact the radially external surface of shield 90' as it rotates.

In FIG. 7 there is shown another embodiment of a protective heat shield 90" differs from the embodiments shown and described with respect to FIGS. 1, 3, 4, and 5 in that the louvers 98 are provided in series of spirally extending rows spaced about the circumfential direction the shield 90".

Figure 8:
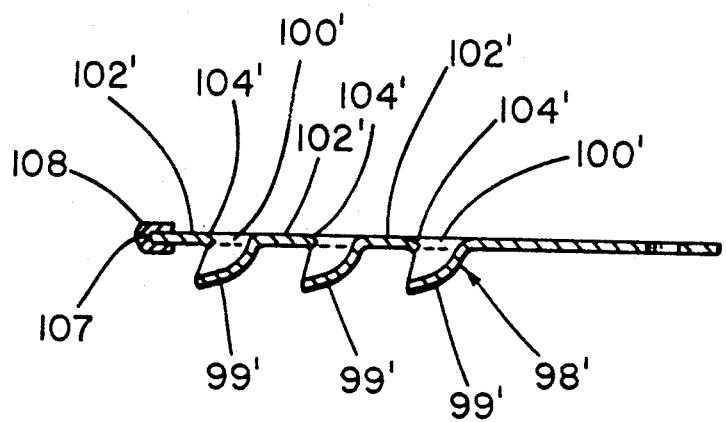
FIG. 8 is a cross-sectional view of a further embodiment of a protective heat shield according to the invention.

A modification of the louvered construction is shown in FIG. 8. Each louver 98' includes a curvilinear cap 99' which overlies the aperture 100' that is modified compared to cap 99 of previously described embodiment of FIG. 3 such that the outermost portion of the cap 99' is nearly straight as shown in FIG. 8 when viewed in in cross-section defined by a plane that includes the central axis of rotation, and that portion of the base 102' of each louver 98' is essentially flat when viewed in cross-section as shown in FIG. 8 (and cylindrical when viewed in a perspective view) with a turned radially outwardly lip 104'. The reinforcing edge 107 is formed of a separate piece of metal 108 that is wrapped around the inboard edge of the shield. This construction is a variation of the previously described embodiment of FIGS. 3 and 4 and the embodiment of FIG. 5.

As shown and described above the protective heat shield 90 is a full circle construction which provides for enhanced thermal protection, structural integrity and clearance to the wheel while also protecting the interior wheel heat shield 60 and heat sink from foreign objects. Such louvered heat shield allows for convection cooling of the heat sink and can be easily replaced if damaged beyond repair. Where the protective heat shield is formed of segments such as segments 110, any segments that are damaged can be easily replaced if damaged beyond repair.

A manner of formation of louvers like those shown in FIGS. 1, 3, 4, and 5 to achieve overlap of their respective apertures by their associated caps is schematically depicted in FIGS. 9A, 9B and 9C sequentially. A flat sheet of metal such as sheet 142 shown in FIG. 9A is deformed to the shape shown in FIG. 9B by stamping in a press fitted with a set of matched (male/female) dies corresponding to the desired shape such as that shown in FIG. 9B. Stamping causes the metal of region 144 to be drawn and that of region 145 to be bent at an angle from base plane 143. The edge of region 145 is then severed slightly above the base plane 142 thereby forming a lip 104 and region 145 is forced away from base plane 143, thereby completing formation of a cap 99 (such as cap 99 shown in FIGS. 1, 3, 4, 5, 7 or 99' as in FIG. 8) whose edge 101 overlaps the lip 104.

A suitable protective heat shield may be constructed from stainless steel (for example, from a sheet of about 0.050 to about 0.060 inch in thickness) or other material that is resistant to corrosion and to warping at the temperatures expected in service.

It will be apparent that although a specific embodiment and a certain modifications of the invention have been described in detail, the invention is not limited to the specifically illustrated and described constructions since variations may be made without departing from the principles of the invention. For example, the number, size, shape and spacing of the louvers may be varied. The louvers may be provided in spirally extending rows as shown in FIG. 7 or other patterns. The radius and height of the lip such as lip 104 may be varied. The louvers may be formed at an angle to the circumferential direction of the shield; however, this is not believed to be the most economical approach because the sense of the angle must be reversed if the shield is to be installed on a wheel and brake assembly to be rotated in the reverse direction, as when a pair of wheels are positioned on opposites sides of the same landing gear. The manner of attachment of the louvered heat shield to the remainder of rotatable wheel and brake assembly may be varied from that described and illustrated. If formed of segments, the segments need not all be identical, although such construction is preferred for economy. The cylindrical shield may be formed of segments that are welded and/or mechanically joined, e.g. by rivets or threaded or other fasteners, to form a complete cylindrical structure prior or subsequent to attachment to the wheel and brake assembly.

We claim:

1. A generally cylindrical heat shield adapted to be affixed to a wheel assembly of the type comprising a tire-supporting wheel having a central axis of rotation and a circumferentially extending rim member having an inboard end, an outboard end and an inner surface surrounding a heat sink composed of a plurality of stator and rotor disc members, a plurality of circumferentially spaced torque bars secured to said inner surface of said rim member and engaging said rotor disc members, said generally cylindrical heat shield having a circumferentially extending inboard edge and axially spaced therefrom a circumferentially extending outboard edge adapted to be secured to the inboard end of said rim member thereby extending axially beyond the inboard end of said rim member to protect said disc members by impeding the ingress of debris and to protect the rim member and tire from radiant heat generated by said disc members while enhancing cooling of said disc members through a plurality of circumferentially spaced louvers permitting convection flow and directed radiation therethrough, while preventing heat radiation from the heat sink from contacting the rim and tire mounted thereon.

2. The heat shield of claim 1 wherein each of said louvers has an aperture of predetermined circumferential length and axial width, and a cap overlying each said respective aperture to deflect material from entering said respective aperture, said cap having a radially outwardly disposed edge that extends axially beyond said aperture to cover an axial width that is greater than said width of said aperture.

3. The heat shield of claim 2 wherein each respective louver has a base that joins the main body of the cylindrical heat shield, said base having a curvature allowing flow of liquid circumferentially therealong while inhibiting the flow of liquid into the aperture.

4. The heat shield of claim 3 wherein the base of each louver includes a circumferentially extending lip that is turned radially outwardly toward the associated cap that overlies such lip.

5. The heat shield of claim 2 wherein the cap is of curvilinear configuration when viewed in cross section defined by a plane that includes the central axis of rotation.

6. The heat shield of claim 5 wherein the base of each louver is flat when viewed in cross section defined by a plane that includes the central axis of rotation.

7. The heat shield of claim 2 further including a reinforcing inboard edge which enhances resistance to deformation of the shield from its generally cylindrical shape.

8. The heat shield of claim 2 wherein the cap is integrally formed by drawing, shearing and bending the metal of which the remainder of the shield is formed.

9. The heat shield of claim 1 wherein the shield is a continuous generally cylindrical structure.

10. The heat shield of claim 1 wherein the shield is formed of a plurality of generally arcuate sections.

11. The heat shield of claim 10 wherein at least one arcuate section has a leading edge and at least another arcuate section has a trailing edge that are of a complementary configuration such that they can be mechanically interlocked to form an arcuate member having an arcuate extent approximating the sum of the arcuate extent of said arcuate sections.

12. The heat shield of claim 1 wherein some of the circumferentially spaced louvers are axially offset relative to others of the circumferentially spaced louvers.

13. The heat shield of claim 1 wherein the louvers are, provided in axially extending rows.

14. The heat shield of claim 1 wherein the louvers are provided in spirally extending rows.

15. The heat shield of claim 1 further including a plurality of circumferentially spaced apertures along its outboard side edge and a plurality of circumferentially spaced cut-out portions along its outboard edge alternating with said apertures.

16. The heat shield of claim 1 further including a plurality of tabs circumferentially spaced around its outboard side edge, each tab including an aperture therethrough.

17. A wheel assembly symmetrical about a central axis comprising a tire-supporting wheel having a circumferentially extending rim member having an inboard end and an outboard end, said rim member having an inner surface surrounding a heat sink composed of a plurality of stator and rotor disc members, a plurality of circumferentially spaced torque bars secured to said inner surface of said rim member and driveably engaging said rotor disc members, a generally cylindrical heat shield secured to the inboard end of said rim member, said heat shield heat extending axially beyond the inboard end of said rim member to protect said disc members by impeding the ingress of debris and to protect the rim member and tire to be mounted thereon from radiant heat generated by said disc members while permitting convection cooling of said disc members, wherein said heat shield has a plurality of circumferentially spaced louvers permitted convection flow therethrough, while preventing heat radiation from the heat sink from contacting the rim and any tire mounted thereon.

18. A wheel assembly as set forth in claim 17 wherein each of said louvers has an aperture of predetermined circumferential length and axial width, and a cap overlying each said respective aperture to deflect material from entering said respective aperture, said cap having a radially outwardly disposed edge that extends axially beyond said aperture to cover an axial width that is greater than said width of said aperture.

19. In an aircraft wheel and brake assembly having an axle with a circular flange thereon, said axle having a central axis around which the assembly is symmetrical, bearing means mounted on said axle; a wheel support mounted on said bearing means for rotation relative to said axle about said central axis, said wheel support having a circumferentially extending rim member and a radially inwardly disposed web portion, a torque tube with an annular hub secured to said circular flange; said torque tube having a plurality of circumferentially spaced splines on its radially external surface; a plurality of stator discs slideably mounted on said splines for axial movement thereon; a plurality of circumferentially spaced wheel torque bars located radially inwardly of said rim member and providing a clearance space therebetween, a plurality of rotor discs splined to said wheel torque bars for rotation therewith and for axial movement thereon; said rotor discs being interleaved with said stator discs to define a heat sink; power means mounted on said circular flange for moving said stator discs and said rotor discs into contact with one other to effect braking; a first interior heat shield located in said clearance space between said rim member of said wheel support and said torque bars for circumferentially encompassing said heat sink, fastener means interconnecting said first heat shield to said torque bars and said rim member; a second generally cylindrical protective heat shield secured to said rim member, said second heat shield having a first outboard portion overlying an inboard portion of said first neat shield, and said second inboard portion extending axially inboard a greater distance from said rim member than said first heat shield to protect said first neat shield and said stator discs and rotor discs, said second heat shield including a plurality of circumferentially spaced louvers permitting convection flow therethrough, while preventing heat radiation from the heat sink from contacting the rim and any tire mounted thereon, and while impeding ingress of any foreign material impacting the radially external surface of the second heat shield.

20. The assembly of claim 19, wherein the inside diameter of the second heat shield is greater than the outside diameter of the first heat shield.

* * * * *